US012397392B2

(12) United States Patent
Pleuger et al.

(10) Patent No.: US 12,397,392 B2
(45) Date of Patent: Aug. 26, 2025

(54) METHOD FOR DETERMINING STATE INFORMATION RELATING TO A BELT GRINDER BY MEANS OF A MACHINE LEARNING SYSTEM

(71) Applicant: Robert Bosch GmbH, Stuttgart (DE)

(72) Inventors: Wolfgang Pleuger, Zuchwil (CH);
Thorsten Klein, Tuebingen (DE);
Thomas Kipfer, Matzingen (CH);
Johannes Fischer, Pliezhausen (DE);
Matthias Amann, Steckborn (CH);
Helena Kuppke, Essligen am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 946 days.

(21) Appl. No.: 17/595,794

(22) PCT Filed: May 11, 2020

(86) PCT No.: PCT/EP2020/062997
§ 371 (c)(1),
(2) Date: Nov. 24, 2021

(87) PCT Pub. No.: WO2020/239412
PCT Pub. Date: Dec. 3, 2020

(65) Prior Publication Data
US 2022/0305616 A1 Sep. 29, 2022

(30) Foreign Application Priority Data
May 27, 2019 (DE) ..................... 10 2019 207 746.3

(51) Int. Cl.
*B24B 49/00* (2012.01)
*B24B 21/08* (2006.01)
(Continued)

(52) U.S. Cl.
CPC ............ *B24B 49/003* (2013.01); *B24B 21/08* (2013.01); *B24B 49/16* (2013.01); *G05B 19/182* (2013.01);
(Continued)

(58) Field of Classification Search
CPC .................................................... B24B 49/003
(Continued)

(56) References Cited

U.S. PATENT DOCUMENTS 4,590,573 A  5/1986  Hahn
5,473,532 A  12/1995 Unno et al.
(Continued)

FOREIGN PATENT DOCUMENTS

CN   109410208 A   3/2019
DE   299 10 147 U1  9/1999
(Continued)

OTHER PUBLICATIONS

Hubsch, H.G., "Abrasive Belt Grinding of Cams", European Production Engineering, Oct. 1994, pp. 21-22 and 24, vol. 18 No. 3/04, Munich, XP000477520.
(Continued)

*Primary Examiner* — Reza Nabi
(74) *Attorney, Agent, or Firm* — Maginot, Moore & Beck LLP

(57) ABSTRACT

A method determines state information relating to a belt grinder. The belt grinder has at least one abrasive belt for grinding a workpiece. The method includes providing measurement data relating to the belt grinder, and determining the state information from the measurement data using a machine learning system. The machine learning system is configured to determine the state information based on the provided measurement data.

20 Claims, 5 Drawing Sheets

(51) Int. Cl.
 *B24B 49/16* (2006.01)
 *G05B 19/18* (2006.01)
 *B24B 49/12* (2006.01)
 *B24B 49/14* (2006.01)

(52) U.S. Cl.
 CPC .............. *B24B 49/12* (2013.01); *B24B 49/14* (2013.01); *G05B 2219/32335* (2013.01)

(58) Field of Classification Search
 USPC .......................................................... 706/23
 See application file for complete search history.

(56) References Cited

U.S. PATENT DOCUMENTS

| | | | | |
|---|---|---|---|---|
| 5,651,719 | A | * | 7/1997 | Pineau .................... B24B 49/04 451/317 |
| 6,102,781 | A | | 8/2000 | Greathouse et al. |
| 6,290,573 | B1 | * | 9/2001 | Suzuki .................. B24B 49/04 451/8 |
| 2002/0108972 | A1 | * | 8/2002 | Bayer .................. B65D 83/206 222/402.13 |
| 2002/0194894 | A1 | * | 12/2002 | Srinivasan ........... G01N 33/346 73/81 |
| 2006/0025045 | A1 | * | 2/2006 | Billig .................... B24B 19/125 451/8 |
| 2018/0056480 | A1 | * | 3/2018 | Tegoeh ................. B24B 49/003 |
| 2018/0215007 | A1 | * | 8/2018 | Huang .................. B24B 21/165 |
| 2020/0070299 | A1 | * | 3/2020 | Chung ................... B24B 21/16 |
| 2020/0122290 | A1 | * | 4/2020 | Bettermann ........... B24B 21/14 |
| 2020/0156210 | A1 | * | 5/2020 | Sullivan ............... B24B 49/003 |
| 2020/0306927 | A1 | * | 10/2020 | Tanikella ............... G06N 20/00 |
| 2022/0108262 | A1 | * | 4/2022 | Cella ...................... G05B 17/02 |
| 2022/0305616 | A1 | * | 9/2022 | Pleuger ................. B24B 49/003 |
| 2025/0001544 | A1 | * | 1/2025 | Hülsemann ............. B24B 21/18 |

FOREIGN PATENT DOCUMENTS

| | | |
|---|---|---|
| DE | 10 2017 001 290 A1 | 8/2017 |
| DE | 10 2016 116 622 A1 | 3/2018 |
| DE | 20 2017 105 160 U1 | 9/2018 |
| DE | 10 2017 120 260 A1 | 11/2018 |
| DE | 10 2017 208 498 A1 | 12/2018 |
| EP | 2 576 137 B1 | 7/2017 |
| EP | 3 290 156 A2 | 3/2018 |
| WO | 00/59678 A1 | 10/2000 |

OTHER PUBLICATIONS

Zafar et al., "A neural network based approach for background noise reduction in airborne acoustic emission of a machining process", Journal of Mechanical Science and Technology, Mar. 2017, pp. 3171-3182, vol. 31, No. 7, KSME & Springer, DOI 10.1007/s12206-017-0606-2.

Song, Y. et al., "A Method for Grinding Removal Control of a Robot Belt Grinding System", Journal of Intelligent Manufacturing, Feb. 13, 2011, pp. 1903-1913, vol. 23, DOI: 10.1007/s10845-011-0508-6, XP093160586.

Chen, J. et al., "Acoustic Signal-Based Tool Condition Monitoring in Belt Grinding of Nickel-Based Superalloys Using RF Classifier and MLR Algorithm", The International Journal of Advanced Manufacturing Technology, Jun. 16, 2018, pp. 859-872, vol. 98, DOI: 10.1007/s00170-018-2270-9, XP093160593.

Pandiyan, V. et al., "In-Process Surface Roughness Estimation Model For Compliant Abrasive Belt Machining Process", 7th HPC 2016—CIRP Conference on High Performance Cutting, 2016, pp. 254-257, vol. 46, Elsevier, XP093160599.

International Search Report corresponding to PCT Application No. PCT/EP2020/062997, mailed Oct. 5, 2020 (German and English language document) (6 pages).

Diez-Olivan, A. et al., "Data fusion and machine learning for industrial prognosis: Trends and perspectives towards Industry 4.0," Information Fusion, Oct. 2019, vol. 50, pp. 92-111 (20 pages).

* cited by examiner

METHOD FOR DETERMINING STATE INFORMATION RELATING TO A BELT GRINDER BY MEANS OF A MACHINE LEARNING SYSTEM

This application is a 35 U.S.C. § 371 National Stage Application of PCT/EP2020/062997, filed on May 11, 2020, which claims the benefit of priority to Serial No. DE 10 2019 207 746.3, filed on May 27, 2019 in Germany, the disclosures of which are incorporated herein by reference in their entirety.

The disclosure relates to a method for determining a piece of state information relating to a belt grinder by means of a machine learning system. The disclosure further relates to the machine learning system and to a method for training the machine learning system. The disclosure furthermore relates to a computer program, to a computer-readable storage medium and to a computer device, which are each provided and configured to carry out the proposed methods. The disclosure further relates to a belt grinder for carrying out the method and to a grinding shoe for use in a belt grinder.

BACKGROUND

The disclosure proceeds from a belt grinder having at least one abrasive belt for grinding a workpiece. Such belt grinders are known from the prior art, for example from EP 2 576 137 A1. In the grinding of materials, in addition to the settings (for example process parameters) and the state of the belt grinder (for example wearing of the belt grinder), the properties and the state of the abrasive belt used for grinding also significantly determine a quality of the grinding result that is achieved.

DE 10 2017 120 260 A1 has proposed a method for monitoring an abrasive belt, in which an emission coming from the abrasive belt for processing the workpiece is determined, wherein reference curves for states of the abrasive belt in relation to heating or in relation to soundwaves coming from the abrasive belt are compared with actual values of the heating and the soundwaves.

There is a constant need to be able to better control and monitor the influencing variables mentioned in order to be able to achieve a grinding result of a higher quality, a lower degree of wearing of the abrasive belt and a longer lifetime of the belt grinder.

SUMMARY

The disclosure proceeds from a belt grinder having at least one abrasive belt for grinding a workpiece.

In a first aspect, the disclosure relates to an, in particular computer-implemented, method for determining a piece of state information relating to the belt grinder, wherein the method comprises at least the following method steps:
providing measurement data relating to the belt grinder,
determining the state information from the provided measurement data by means of a machine learning system, wherein the machine learning system is configured to determine, in particular also to output, the state information based on the provided measurement data.

In one embodiment of the method, the method for determining the state information can be implemented exclusively in hardware. In an alternative embodiment, the method can also be realized in the form of software or in a mixture of software and hardware. In particular, the method can constitute a computer-implemented method, which is carried out by means of a computer device. In order to carry out the method, the computer device can have at least one processor device and also at least one storage device, in which the method is stored as a computer program.

A belt grinder is to be understood as a tool for grinding a workpiece, in which the grinding means is realized in the form of a revolving abrasive belt. In the following text, the term "belt grinder" includes an abrasive belt used in the belt grinder and a grinding shoe used in the belt grinder and the like. The belt grinder can be realized, for example, in the form of a hand-held belt grinder or in the form of a large industrial-scale belt grinder assembly. Such industrial belt grinders are used, for example, for large-area grinding of workpieces such as, for example, boards made of raw material (such as chipboards, MDF, HDF and OSB boards). During a grinding process, the abrasive belt is moved, in particular continuously, relative to the surface of the workpiece to be processed and an abrasive action is exerted on the workpiece in this way. The abrasive belt is typically driven here by rollers in a circumferential direction of the belt and is pressed in a pressing direction against the surface of the workpiece to be processed by means of a grinding shoe. In the case of an industrial belt grinder, the length of the abrasive belt in the circumferential direction of the belt can be between 1.5 and 5 meters, for example. A width of the abrasive belt, that is, perpendicular to the circumferential direction of the belt, can be between 0.3 and 5.0 meters in the case of such a belt grinder, for example. In the case of hand-held belt grinders, the abrasive belts can have a length in the circumferential direction of the belt of typically between 0.35 and 1 meter. A width of the abrasive belt of a hand-held belt grinder can typically be between 7.5 cm and 15 cm. Other lengths and widths are likewise conceivable.

"Provision of measurement data" is to be understood to mean, in particular, that a device that carries out the method, in particular a processor device or a computer device or a computer device comprising a processor device, has the corresponding measurement data—relating to the belt grinder—provided or transmitted or fed to it in terms of signal technology. In one embodiment of the method, the corresponding measurement data can be provided by importing the measurement data from a file. For example, measurement data can be provided by importing from data stored on a data server or from data stored in a storage device on the belt grinder. In an alternative or additional embodiment of the method, measurement data can be determined or measured and subsequently provided using sensors, in particular sensors of the belt grinder. Sensors are to be understood here as metrological devices, by means of which measurement data relating to the belt grinder can be captured. In one embodiment of the method, the measurement data are measured and provided using at least one sound sensor, in particular an airborne sound sensor and/or a solid-borne sound sensor and/or a vibration sensor. Sound sensors make it possible to capture mechanical oscillations (soundwaves) coming from the belt grinder and/or the abrasive belt. The measurement data captured and provided by means of a sound sensor relate to the belt grinder and allow, in particular, analyses and conclusions with respect to mechanical properties of the abrasive belt and/or of the belt grinder during a grinding process. The mechanical properties can permit assertions about defects in the abrasive belt, for example, or else clogging or blunting of the abrasive belt. Clogging in this case denotes the filling of intermediate spaces between abrasive grains on the abrasive belt with grinding waste or grinding dust.

Furthermore, features of an abrasive belt, such as for example specifically applied elevations on the abrasive belt—for example in the form of a barcode—can be imported and assertions about a used abrasive belt can be derived in this way. In particular, it is also conceivable to use sound sensors that are particularly configured and/or restricted in terms of the frequency range that can be detected. In particular, infrared sensors (typically below 16 Hz), acoustic sound sensors (typically from 16 Hz to 20 kHz), ultrasonic sensors (typically from 20 kHz to 1.6 GHz) and/or hypersonic sensors (typically above 1 GHz) or combinations thereof are conceivable. In one embodiment of the method, the selection of the at least one sound sensor and, in particular, also the frequency range in which the at least one sound sensor actively detects is tuned to a specific belt grinder. In particular, solid-borne sound sensors and vibration sensors make it possible to capture tremors, vibrations, resonances or the like, which cannot or can hardly be perceived by humans in measurement data and thus provide same to the method according to the disclosure for determining the state information relating to the belt grinder. In one embodiment of the method, the at least one sound sensor can be realized, for example, by way of a MEMS microphone sensor and/or by way of a laser microphone sensor and/or by way of a piezo sensor or the like. Such sensors are known to a person skilled in the art. The evaluation of the measurement data captured and provided by means of the at least one sound sensor comprises, in particular, finding characteristic frequency components and/or sound amplitudes. In an alternative or additional embodiment of the method, the measurement data are captured (measured) and provided using at least one further sensor, wherein the at least one further sensor is selected from a list of sensors comprising:

sensors for current consumption of the belt grinder, in particular of the drive device of the abrasive belt of the belt grinder: for example, a coil by means of which a current consumption of a drive motor is captured inductively can be provided as sensor. The measurement data provided in this way relate to the belt grinder to the effect that they permit, in particular, analyses and conclusions with respect to a state of the abrasive belt (clogging, wear or the like) and/or of the belt grinder (wearing of the bearings, wearing of the drive motor or the like). For example, it is been found that the current consumption correlates to a friction between the abrasive belt and the workpiece, wherein the friction is significantly influenced by a clogging of the abrasive belt;

air temperature sensors: the measurement data provided in this way relate to the belt grinder to the effect that they permit, in particular, analyses and conclusions with respect to heating during a grinding process, which in turn correlates to a clogging or wear or the like of the abrasive belt and/or to a wearing of the belt grinder (wearing of the bearings, wearing of the drive motor or the like);

humidity sensors and/or moisture sensors: the measurement data provided in this way relate to the belt grinder to the effect that they permit, in particular, analyses and conclusions with respect to the nature of the material of the workpiece, which in turn correlates to a grinding behavior and/or cutting behavior of the abrasive belt, a service life of the abrasive belt, a surface quality of the grinding result achieved, a clogging of the abrasive belt (for example adhesive bonding in the case of relatively high humidity) or the like;

distance sensors and/or range sensors, in particular laser distance sensors or laser range sensors: the measurement data provided in this way relate to the belt grinder to the effect, for example, that they permit, in particular, analyses and conclusions with respect to an oscillation of the abrasive belt ("belt fluttering") and thus correlate to a tension of the abrasive belt ("tensile stress");

imaging, particularly visual, sensors, very particularly cameras, high-speed cameras, cameras with flash or strobe light—which are operated, for example, at wavelengths of the visible spectrum or of the UV spectrum or of the IR spectrum: the measurement data provided in this way relate to the belt grinder to the effect that they permit, in particular, analyses and conclusions with respect to optical properties of the abrasive belt and/or of the belt grinder during a grinding process. The optical properties can permit, for example, assertions about defects in the abrasive belt or else about clogging or wear of the abrasive belt. Furthermore, features of an abrasive belt, such as for example a specifically applied barcode or QR code, can be imported and assertions about a used abrasive belt can be derived in this way;

temperature sensors, particularly IR sensors, very particularly thermal imaging sensors: the measurement data provided in this way relate to the belt grinder to the effect that they permit, in particular, analyses and conclusions with respect to a temperature and/or a temperature distribution of the abrasive belt and/or of the belt grinder during a grinding process. The thermal properties can permit, for example, assertions about defects in the abrasive belt or else about clogging or wear of the abrasive belt. For example, a clogging of the abrasive belt correlates to an increase in the friction and thus brings about an increase in the temperature of the abrasive belt. Furthermore, the measurement data can relate to a temperature and/or a temperature distribution of a workpiece (for example before, during and after the grinding process) and can likewise make possible analyses and conclusions relating to the belt grinder;

thickness-measuring sensors: the measurement data provided in this way relate to the belt grinder to the effect that they permit, in particular, analyses and conclusions with respect to a material removal of the workpiece and/or a clogging of the abrasive belt or the like and thus correlate, for example, to wear of the abrasive belt;

torque sensors: the measurement data provided by torque sensors relate to the belt grinder to the effect that they permit, in particular, analyses and conclusions with respect to a drive of the abrasive belt and can correlate, for example, to a friction between the abrasive belt and the workpiece, wherein the friction is influenced in turn, for example, by a clogging of the abrasive belt;

dust quantity measurement sensors: the measurement data provided in this way relate to the belt grinder to the effect that they permit, in particular, analyses and conclusions with respect to a material removal of the workpiece and/or a clogging of the abrasive belt or the like and thus correlate to a wear of the abrasive belt. By way of example, dust quantity measurement sensors can be arranged in an exhaust air duct of the belt grinder and capture an amount and/or a particle size distribution of grinding dust produced:

acceleration sensors, path length sensors, inertial sensors: the measurement data provided in this way relate to the belt grinder to the effect that they permit, in particular, analyses and conclusions with respect to mechanical movement of the abrasive belt and/or of the belt grinder. For example, the measurement data can relate to components within the belt grinder or can relate to the workpiece (for example advancing speed during a grinding process). The measurement data correlate, in particular, to operating parameters and/or deviations from desired operating parameters of the belt grinder and thus likewise make possible assertions about a wear of the abrasive belt and/or of the belt grinder;

location sensors: the measurement data provided in this way relate to the belt grinder to the effect that they permit, in particular, analyses and conclusions with respect to objects—such as, for example, metal items (for example nails)—introduced into the belt grinder and/or into the workpiece and/or with respect to objects—such as, for example, metal cuttings—introduced into the abrasive belt during a grinding process. The measurement data can thus permit assertions about possible (foreseeable) defects in the abrasive belt or else about possible dangers during operation of the belt grinder. Exemplary location sensors may comprise magnetic field sensors, radar sensors, inductive sensors, capacitive sensors, nuclear magnetic resonance sensors or the like;

touch-sensitive sensors: the measurement data provided by touch-sensitive sensors relate to the belt grinder to the effect that they permit, in particular, analyses and conclusions with respect to haptic surface properties of the workpiece and/or of the abrasive band (for example roughness) and can correlate, for example, to a friction between the abrasive belt and the workpiece. Furthermore, touch-sensitive sensors can be used to determine "belt fluttering" (oscillations on the abrasive belt);

reflectance sensors: the measurement data provided by reflectance sensors relate to the belt grinder to the effect that they permit, in particular, analyses and conclusions with respect to surface properties of the workpiece and/or of the abrasive band (for example roughness) and can correlate, for example, to a friction between the abrasive belt and the workpiece. Typical reflectance sensors can be realized, for example, using laser radiation, wherein the laser radiation is reflected at a surface to be examined and a reflected laser intensity is detected;

or combinations thereof. Measurement data from sensors of said list are well-suited for determining the state information according to the method according to the disclosure. By providing measurement data that are captured by means of a plurality of, in particular various, sensors, it is possible to determine particularly precisely and reliably a piece of state information relating to the belt grinder. In particular, measurement data adapted in such a way to a belt grinder that is to be analyzed can be provided in order to carry out the method. Furthermore, redundant measurement data can sometimes make it possible to prevent incorrect analyses and in this way make it possible to determine a piece of state information more precisely. Furthermore, different and/or complementary and/or redundant state information can be determined based on measurement data that are captured by means of a plurality of, in particular various, sensors.

In one embodiment of the method for determining a piece of state information, the measurement data are provided or retrieved selectively, in particular are provided by or retrieved from the belt grinder selectively. For example, provision can be made for the measurement data to be stored on a storage device, in particular a network storage device (server) or a storage device of the belt grinder, wherein the measurement data are retrieved from the storage device selectively and are subsequently provided to the computer device, for example a server in a cloud, that carries out the method. In particular, it is thus possible to achieve a situation in which a volume of data to be transmitted in order to carry out the method is variable and can be provided selectively in particular depending on a piece of state information to be determined. This means that only those measurement data that are actually required to carry out the method for determining a specific piece of state information are provided whilst other possibly present measurement data are not provided. In one exemplary embodiment, the measurement data are kept available in a database or like in a database. In particular, a piece of state information that is of interest to a user can be selected by way of an input or selection by the user, for example by means of an input device or by means of a menu selection or the like.

In one embodiment of the method for determining a piece of state information, the measurement data are filtered before being provided. In particular, voice components (in particular human voices) in the measurement data are filtered out. As an alternative or in addition, other interfering influences, for example a background signal component, are filtered out of the measurement data. In this way, interfering influences in the measurement data that adversely affect a reliable determination of a piece of state information can be removed. In particular, interfering influences for which the machine learning system is not trained and/or for which the machine learning system can be trained only with high outlay are removed from the measurement data. Voice components in the measurement signals constitute a particularly significant interfering influence according to current knowledge.

A piece of state information relating to the belt grinder is to be understood as a piece of information that permits an assertion about the state of the belt grinder—such as progress of wear, need for maintenance—and/or about the state of the abrasive belt—such as progress of wear, need for replacement—and/or about the operation of the belt grinder—such as process parameters, recommendations for changing a process parameter. In particular, the determination of a piece of state information enables a machine, process and/or operating efficiency to be increased, for example by way of an early indication of problems, faults, necessary activities (such as maintenance) and an associated reduction in machine stoppages, wastage (consistently high quality in the grinding process) and training requirements for users who operate the belt grinder. In one embodiment of the method, a piece of state information is defined or selected in such a way that it relates to at least one of the following properties:

a property that characterizes a workpiece to be processed, for example a material type such as "wood", "metal" or a material property such as "high hardness", "average hardness" or the like;

a property that characterizes manufacturing defects on the workpiece, for example so-called dynamic streaks, "chatter marks" or instances of roughness on the workpiece;

a property that characterizes an operating mode or operating parameter of the belt grinder, for example a power consumption, an advancement rate of the workpiece or a "summer operation"/"winter operation" (the time of year has an influence in particular on the dampness of abrasive belts, wherein the dampness in turn has an effect on the elasticity of the abrasive belts and thus on a material removal rate, service life or the like of the abrasive belts);

a property that characterizes incorrect settings of the belt grinder, for example an excessively high abrasive belt tension or an excessively high abrasive belt rotational speed or an unsuitable grinding pressure of the grinding shoe or the like;

a property that characterizes a load distribution of the belt grinder, for example a wear of the abrasive belt that is uneven over the width of the abrasive belt and/or an uneven wear of the individual abrasive belts occurring in the case of several abrasive belts used in parallel:

a property that characterizes a degree of wear or a wearing of the belt grinder, for example an ageing process of bearings, rollers, grinding shoe, wearing out of machine components, a parameter drift or the like;

a property that characterizes an abrasive belt used in the belt grinder, for example an abrasive belt type such as "P120" or settings that are preferably to be used for the optimal use of the abrasive belt (number of revolutions of the abrasive belt, abrasive belt tension etc.);

a property that characterizes clogging and/or blunting of the abrasive belt, a property that characterizes a defect of the abrasive belt, for example the presence of tears in the abrasive belt or of foreign particles such as metal shavings in or on the abrasive belt;

or combinations thereof.

In one embodiment of the method, it is also conceivable to make provision for different pieces of state information to be determined or for a piece of state information that is to be determined to be selectable by way of a user of the belt grinder. In this way, a particularly comprehensive and flexibly adjustable method can be specified, using which a user obtains a particularly good overview of the state of the belt grinder, the abrasive belt and/or the workpiece.

A piece of state information is determined from the provided measurement data by means of a machine learning system, wherein the machine learning system is configured to determine, in particular also to output, the corresponding state information based on the provided measurement data. In this case, the machine learning system is to be understood in particular as a technical realization of a self-learning system that learns from prescribed examples—the so-called training data—and can generalize the learned behaviors after the learning phase has ended by virtue of it identifying patterns and rules in the training data and making these able to be retrieved. Such machine learning systems are known in principle, for example from DE 10 2005 050 577 A1. It is proposed that in one embodiment of the method for determining a piece of state information the machine learning system comprises an, in particular artificial, neural network. In this case, the neural network consists of a chain of neural layers, wherein the topology of the network for carrying out the method is configured and adapted, in particular parameterized. The machine learning system, in particular the neural network, is in this case first provided with measurement data as input variable (training input data), wherein the training input data are subsequently propagated by the machine learning system, in particular by the neural network. In particular, in the case of a neural network, each (hidden) layer of the neural network accordingly calculates an output variable, which in turn is used internally as input variable of a following layer of the network. The last layer of the network (output layer) enables the corresponding state information that has been estimated based on the input measurement data to be read out. A machine learning system, in particular a neural network such as, for example, a Bayesian network, in this case has the advantage that a more reliable and more precise determination of a piece of state information relating to the belt grinder (including abrasive belt and workpiece) is possible compared to existing statistical approaches—as are known, for example, from the prior art in DE 10 2017 120 260 A1. In particular, even in the case of large amounts of measurement data and different influencing factors on a piece of state information, it is possible to obtain useful results in the determination of the corresponding state information. In one embodiment of the method, the neural network is realized as a recurrent neural network or as a convolutional neural network. It is also conceivable that the machine learning system executes a regression, that is to say predicts a progression of a piece of state information.

In one embodiment of the method, the belt grinder is controlled at least partly based on the determined state information and/or a piece of information is output at least partly based on the determined state information by means of an output device. In order to control the belt grinder, the determined state information is output, in particular transmitted, to a control device of the belt grinder for this purpose. By means of the control device, it is thus possible to determine a control variable for actuating a physical actuator of the belt grinder using the state information. A control device is used here to control, in particular to operate, a physical actuator, for example by applying closed-loop control routines and/or open-loop control routines. The control device is at least provided to carry out further processing at least partly based on the determined state information and in this way to translate the corresponding state information to a control variable for actuating the actuator. For example, it is conceivable that process parameters such as, for example, the belt rotational speed are automatically adjusted depending on the determined state information. In this way, a particularly efficient monitoring method for monitoring and controlling the belt grinder, in particular for automatically adjusting the belt grinder, can be specified. The belt grinder can be functionalized in this way to form an at least partly autonomous belt grinder. In particular, it is thus made possible for the belt grinder to begin a grinding process automatically, to end it automatically and/or to select and/or influence at least one parameter relating to the implementation of the grinding process automatically. The output device may be an output device of the computer device that carries out the method and/or an output device of the belt grinder and/or a separately formed output device. A separately formed output device may be realized, for example, by way of a computer, a mobile data apparatus such as a tablet, or the like. For example, it is conceivable to output a piece of information at least partly based on the determined state information using a tactile, acoustic or visual output device. In particular, an output in graphical form may be effected using a screen. As an alternative or in addition, an output to an external apparatus can be effected using a data communication device. It should be noted that, by applying the method according to the disclosure for determining a piece of state information, in particular in combination with the output of the information based at least partly on the determined state information, the determined state information relating to the belt grinder is advantageously accessible to the human perception of the user. In this case, the information refers to a piece of information prepared for output by means of an output device, in particular prepared in a user-friendly manner, and based at least partly on the determined state information. In particular, the information for output can also correspond to the state information. For example, it is conceivable that the information is output in the form of a traffic light signal—which signals the time of an abrasive belt change—to a user of a belt grinder directly at the belt grinder.

According to a further aspect of the disclosure, an, in particular computer-implemented, method for training a machine learning system, in particular a neural network, is proposed. The method can be supported by a processor. The method for training causes the machine learning system to be configured, that is to say specifically trained and/or parameterized, to carry out the above-described method for determining a piece of state information relating to a belt grinder. The method for training has at least the following method steps:

providing training data consisting of training input data and training output data, wherein the training input data comprise measurement data relating to a belt grinder for a plurality of pieces of state information and the training output data comprise in each case at least one assigned piece of state information relating to the belt grinder, training the machine learning system, in particular the neural network, wherein parameters of the machine learning system are adapted in such a way that the machine learning system determines the respectively assigned training output data depending on the adapted parameters and depending on the provided training input data.

In a further method step, the trained machine learning system is added to a computer device, in particular a control device of a belt grinder to be monitored in particular (that is to say a belt grinder).

Following the provision of training input data, the machine learning system, in particular the neural network, determines a first output value from said data. This output value is fed to a training system (for example a computer device) in the training process, wherein the training system determines from this a specification for adjusting the parameters, said specification prescribing which parameter or parameters of the machine learning system is or are to be subjected to an adjustment and in which way in order to make possible a more precise determination of the prescribed training output data. In the case of a neural network, this adjustment can be effected by prescribing expected or desired values for the output value and subsequent reverse propagation. It is also proposed that, in one embodiment of the method for training, the training input data are selected from a list at least comprising measurement data as are provided by a sensor of the following list: sensors for current consumption, air temperature sensors, humidity sensors and/or moisture sensors, distance sensors and/or range sensors, imaging, in particular visual, sensors, temperature sensors, particularly IR sensors, very particularly thermal imaging sensors, thickness-measuring sensors, torque sensors, dust quantity measuring sensors, acceleration sensors, path length sensors, inertial sensors, location sensors, touch-sensitive sensors, reflectance sensors or combinations thereof. It is also proposed that the training output data are selected from a list of state information relating to at least the following properties: a property that characterizes a workpiece to be processed; a property that characterizes manufacturing defects on the workpiece; a property that characterizes an operating mode or operating parameter of the belt grinder; a property that characterizes incorrect settings of the belt grinder; a property that characterizes a load distribution of the belt grinder; a property that characterizes a degree of wear or a wearing of the belt grinder; a property that characterizes an abrasive belt used in the belt grinder; a property that characterizes clogging and/or blunting of the abrasive belt; a property that characterizes a defect of the abrasive belt or combinations thereof. In this way, a particularly target-oriented method for training can be specified, which is adjusted to provided measurement data to advantageously be used in a method for determining a piece of state information relating to a belt grinder, since it uses the same information sources as basis for the training.

In one embodiment of the method for training, in a further method step, further measurement data, relating to a belt grinder, in particular a belt grinder to be monitored, are provided, wherein at least one, in particular prescribed, piece of state information relating to the belt grinder is assigned to the further measurement data, in particular by way of an expert, and in such a way that the machine learning system is further trained using the further measurement data. "Further training" is to be understood to mean in particular that the machine learning system is trained repeatedly using the now provided further training data of the belt grinder, in particular the belt grinder to be monitored. In this way, it is possible to realize that the machine learning system is first of all pre-trained using "general measurement data", is subsequently assigned to a computer device, particularly to a control device, very particularly to a control device of a belt grinder to be monitored, and then further trained using further training data matched to the belt grinder to be monitored. Consequently, particularly well-trained machine learning systems can be realized on a respective belt grinder, said machine learning systems also making possible a particularly reliable determination of a piece of state information relating to the respective belt grinder.

In one embodiment of the method for training, the training input data comprise measurement data and further measurement data for a plurality of pieces of state information and the training output data comprise in each case at least one assigned piece of state information, wherein the measurement data and the further measurement data relate to at least two belt grinders of different types or to at least two belt grinders of the same type with a different use (that is to say with different grinding processes, in particular relating to processed materials, process parameters or the like) from one another or to two belt grinders of the same type with the same use.

In particular, a first belt grinder constitutes one from which the general training data are provided. The second belt grinder very particularly constitutes a belt grinder to be monitored, to the computer device of which, in particular to the control device of which, the machine learning system has been added. Therefore, the first belt grinder may be identical to the second belt grinder or as an alternative may also be different to the second belt grinder. In this case, the second belt grinder constitutes a further belt grinder. The first of the three alternatives makes it possible to specify a particularly universal machine learning system that can determine a piece of state information for a plurality of belt grinders. The second alternative makes it possible to specify a particularly universal machine learning system for a belt grinder that can determine a piece of state information relating to the belt grinder for a plurality of grinding processes—in particular using a plurality of materials, process parameters etc. The third alternative makes it possible to specify a particularly specific machine learning system for a belt grinder that can determine a piece of state information relating to the belt grinder for a relatively low number of grinding processes—in particular using a plurality of materials, process parameters, etc. In any case, a particularly high reliability and robustness in the determination of the state information can be achieved here.

A further aspect of the disclosure proposes the machine learning system, in particular the neural network, for carrying out the method according to the disclosure for determining a piece of state information. The machine learning system is obtained, in particular, by carrying out the method according to the disclosure for training the machine learning system.

A further aspect proposes a computer program. The computer program is configured to carry out one of the previously mentioned methods. The computer program comprises instructions, which, when executed on a computer device, that is to say in particular when executed by a processor device of a computer device, cause the computer device to carry out one of the described methods with all of its steps.

A computer-readable storage medium is also proposed, on which the computer program is stored, in particular saved. Storage media as such are known to a person skilled in the art Furthermore, a computer device, in particular a control device of a belt grinder, is proposed, said computer device being configured to carry out one of the described methods. In particular, a computer device for determining a piece of state information relating to a belt grinder having at least one processor device and a storage device is proposed, wherein the storage device stores instructions, which, when executed by the processor device, cause the computer device to carry out the method. A "processor device" is intended to be understood as meaning in particular a device that has at least one information input, an information processing unit for processing and an information output for forwarding the processed and/or evaluated information. In one exemplary embodiment, the processor device comprises at least one processor. A "storage device" is used here to keep a computer program required to carry out one of the described methods available for the processor device.

In one embodiment of the computer device, the computer device is configured to determine a control variable for actuating a physical actuator, in particular a control variable for actuating the belt grinder, using a determined piece of state information and/or to determine a control variable for actuating an output device and/or to execute a function. In one exemplary embodiment, the physical actuator may be realized as an automatic warehouse system, by means of which required abrasive belts, grinding shoes or the like can be output in automated manner. A function may be implemented, for example, by way of changing system settings or process settings of the belt grinder in a manner dependent on the determined state information.

A further aspect of the disclosure proposes a belt grinder comprising an abrasive belt for grinding a workpiece, which is characterized by at least one sound sensor for capturing and providing measurement data for carrying out one of the methods according to the disclosure. In one embodiment of the belt grinder, the at least one sound sensor, in particular an airborne sound sensor and/or a solid-borne sound sensor and/or a vibration sensor, is arranged on or in a grinding shoe of the belt grinder. A grinding shoe typically consists of a carrier device and a grinding shoe lining, wherein the grinding shoe lining is typically inserted into the carrier device and/or is arranged thereon/therein in another way. The grinding shoe including the grinding shoe lining is provided to mount an abrasive belt moving in the circumferential direction of the belt relative to the grinding shoe lining in a low-friction manner and at the same time to press against the workpiece (or to act as resistance against a workpiece pressed against grinding shoe). The at least one sound sensor is preferably arranged on or integrated in the carrier device of the grinding shoe. As an alternative or in addition, the at least one sound sensor is arranged on or in the grinding shoe lining. In this way, it is possible to realize that the sound sensor is located particularly close to the location of the grinding process and measurement data can be captured particularly effectively and in particular with low interference. In particular, this arrangement of the at least one sound sensor allows state information to be determined particularly reliably, said state information characterizing a property of the abrasive belt and/or a property of the grinding process. In one embodiment, the at least one sound sensor is arranged on the grinding shoe and/or in the belt grinder in a substantially central manner-with respect to a width of the abrasive belt perpendicular to the circumferential direction of the belt and/or with respect to a width of the grinding shoe perpendicular to the circumferential direction of the belt. In such a way, it is possible to realize that a particularly good signal capture within the belt grinder is possible. As an alternative or in addition, a plurality of sound sensors can be arranged in a manner distributed over a width of the abrasive belt and/or over a width of the grinding shoe and/or can be arranged on the grinding shoe and/or in the belt grinder in a manner distributed over a width of the grinding shoe.

In an alternative or additional embodiment of the belt grinder, the at least one sound sensor, very particularly a further sound sensor, in particular an airborne sound sensor and/or a solid-borne sound sensor and/or a vibration sensor, is arranged in a manner assigned to a roller of the belt grinder. In this case, a roller can be selected as a contact roller, deflection roller, tensioning roller, drive roller or the like. "Arranged in a manner assigned" to the roller means that the sound sensor is arranged in or on or immediately on the roller. For example, the at least one sound sensor can be arranged on a roller suspension system of a roller of the belt grinder. As an alternative, the at least one sound sensor can also be realized in a manner integrated into a roller. It has been found that in this way it is possible to realize that the sound sensor is arranged particularly close to the location of the production of the abrasive belt advancement and measurement data can be captured particularly effectively and in particular with low interference. In particular, with this arrangement of the at least one sound sensor, it is possible to determine state information particularly reliably, said state information characterizing a property of the belt grinder and/or a property of the grinding process.

In one embodiment of the belt grinder, at least two sound sensors are arranged on the grinding shoe and/or in the belt grinder and/or in a manner assigned to a roller on both sides—with respect to a width of the abrasive belt and/or with respect to a width of the grinding shoe. Surprisingly, a two-sided arrangement of two sound sensors, in particular on a roller, has proven to be advantageous with respect to signal capture in the belt grinder.

In one embodiment of the belt grinder, the at least one sound sensor is connected or can be connected to the computer device, in particular to the control device of belt grinder, and/or to a computer device external to the belt grinder, in particular using a gateway. The connection can be realized as wired or wireless. For example, the connection can be realized using an ethernet connection, a glass fiber connection, an Internet connection, a radio connection or a direct connection. In particular, the sound sensor is also connected or can be connected to further signal-technical components of the belt grinder, for example two further sensors, via the gateway.

In one embodiment of the belt grinder, the sound sensor is realized by way of a MEMS microphone sensor and/or by way of a Piezo sensor and/or by way of a laser microphone sensor.

A further aspect of the disclosure proposes a grinding shoe for use in a belt grinder, comprising at least one sound sensor, in particular an airborne sound sensor and/or a solid-borne sound sensor and/or a vibration sensor, for providing measurement data for carrying out one of the proposed methods. As described, the at least one sound sensor is arranged in particular in a carrier device of the grinding shoe. The at least one sound sensor can also be arranged substantially centrally with respect to a width of the grinding shoe (that is to say perpendicular to the circumferential direction of the abrasive belt). As an alternative, a plurality of sound sensors can be arranged on or in the grinding shoe in a manner distributed over a width of the grinding shoe.

In the following text, "provided" and "configured" are intended to be understood as meaning specifically "programmed", "designed", "conceived", "parameterized" and/or "equipped". The fact that an object is "provided" for a particular function is intended to be understood as meaning that the object fulfills and/or executes this particular function in at least one application and/or operating state or is designed to fulfill this function.

It should be noted that the features that are discussed in the description of the methods and that imply a structural implementation, can also be transferred analogously to corresponding devices that are likewise considered as disclosed. For example, a frequency range of a sound sensor disclosed in connection with the method for determining a piece of state information can thus be transferred directly to a sound sensor that operates in the corresponding frequency range.

BRIEF DESCRIPTION OF THE DRAWINGS

The disclosure is explained in more detail in the following description based on exemplary embodiments illustrated in the drawings. The drawing, the description and the claims contain numerous features in combination. A person skilled in the art will expediently also consider the features individually and combine them to form useful further combinations. Identical reference signs in the figures denote identical elements.

In the figures.

DETAILED DESCRIPTION

Figure 1:
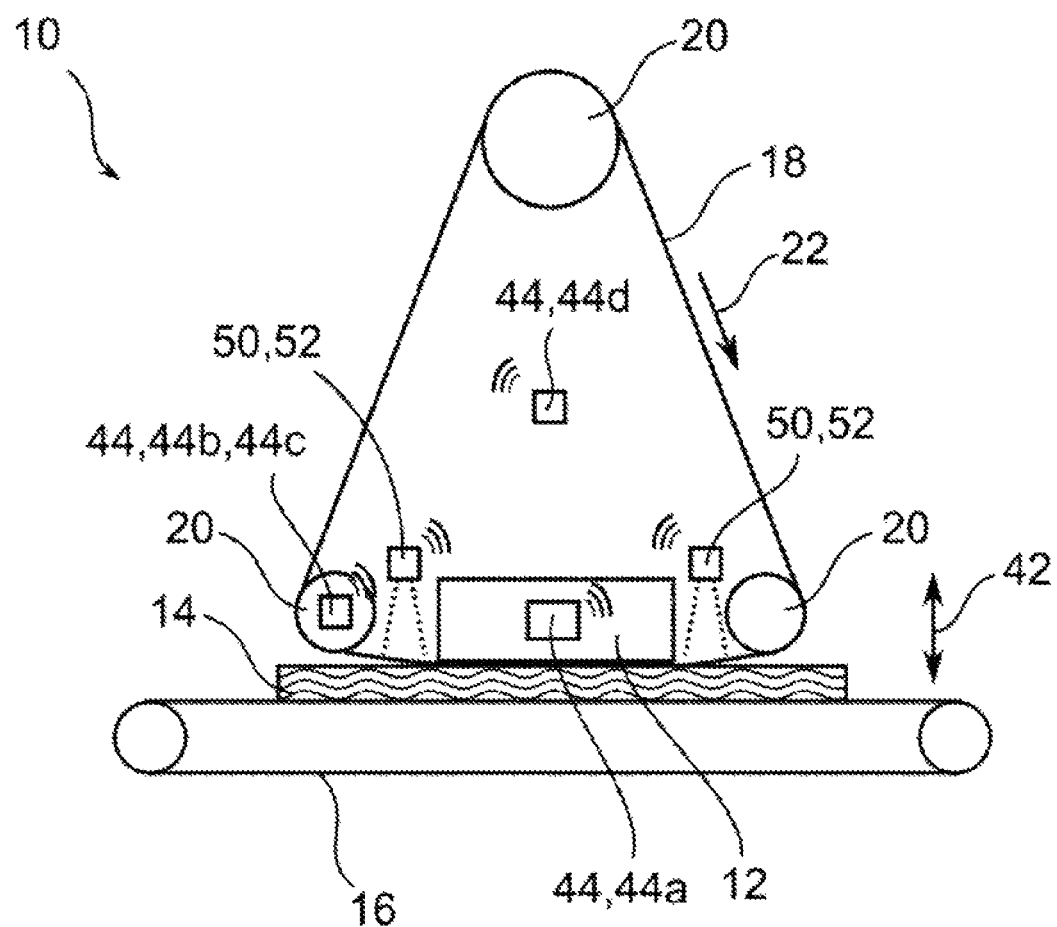
FIG. 1 shows a schematic illustration of an embodiment of a belt grinder in a sectional view.
Figure 1:
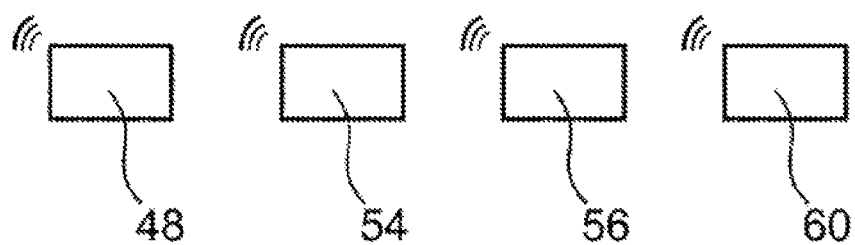

FIG. 1 shows a schematic illustration of an embodiment of a belt grinder 10 having a grinding shoe 12 in section. A workpiece 14 is ground on a grinding table 16 underneath a rotating abrasive belt 18 during a grinding process. The abrasive belt 18 is driven by three rollers 20, in this case drive rollers, in a circumferential direction 22 of the belt and is pressed against the workpiece 14 by way of the grinding shoe 12.

Figure 2:
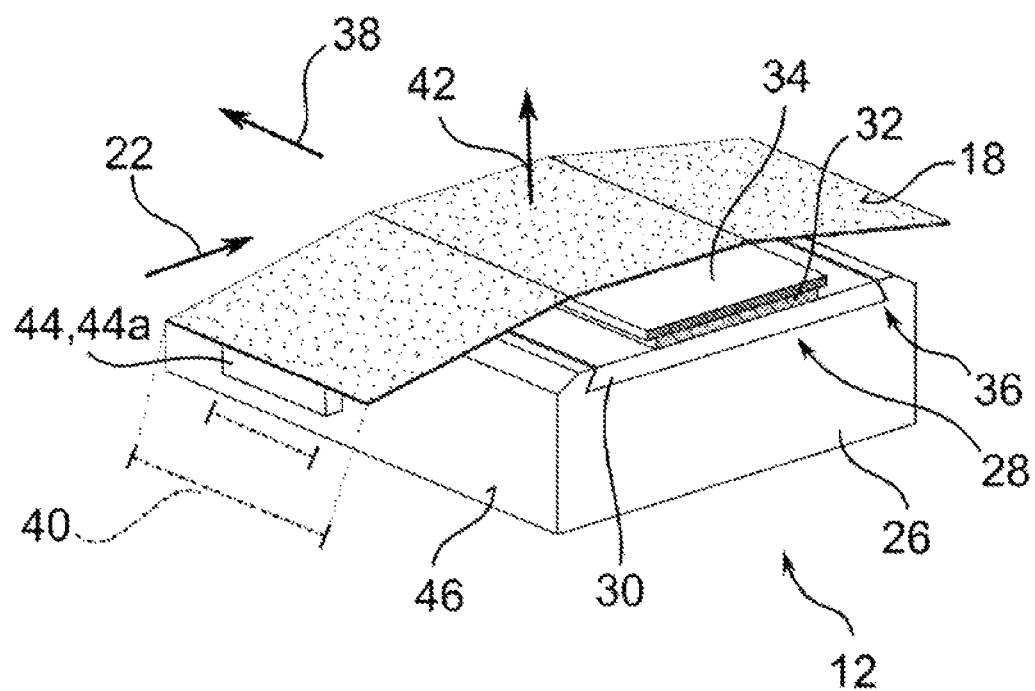
FIG. 2 shows a schematic illustration of an embodiment of a grinding shoe including abrasive belt in a perspective view.

FIG. 2 shows the grinding shoe 12 in an enlarged perspective illustration. The grinding shoe 12 comprises a carrier device 26 and a grinding shoe lining 28. The grinding shoe lining 28 has a liner carrier 30 made of MDF (as an alternative also plastic or cardboard or fiber or metallic materials), to which a cushioning layer as support lining 32 made of solid foam is adhesively bonded. A slide lining 34, which is produced from a graphite-coated fabric, is adhesively bonded to the support lining 32. The carrier device 26 is provided with recesses 36, into which the lining carrier 30 of the grinding shoe lining 28 can be inserted in an insertion direction 38. The lining carrier 30 has a dovetail-shaped cross-sectional profile that corresponds to the recesses 36. The lining carrier 30 has an elongate design in the insertion direction 38 with a length of 3000 mm, wherein the length in this case extends in the direction of the width 40 of the abrasive belt 18. The width of the lining carrier 30 perpendicular to the insertion direction 38 and perpendicular to the contact direction 42 has a width of 75 mm.

The belt grinder 10 comprises four sound sensors 44, three of which are solid-borne sound sensors 44a, b, c (sound sensor 44c is located on the rear side in FIG. 1 and is therefore not visible separately) and one of which is an airborne sound sensor 44d, for capturing and providing measurement data relating to the belt grinder 10. The measurement data captured by the sound sensors 44 are sound measurement data. A first solid-borne sound sensor 44a is screwed to a surface 46 of the carrier device 26 of the grinding shoe 12, said surface facing the abrasive belt 18, centrally with respect to the width 40 of the abrasive belt 18 and there captures solid-borne sound, which is transmitted by the grinding shoe 12. The first solid-borne sound sensor 44a is thus arranged in direct proximity to the abrasive belt 18. A second solid-borne sound sensor 44b and a third solid-borne sound sensor 44c are screwed to both sides of a roller 20 of the belt grinder 10 (cf. FIG. 1), with the result that the two solid-borne sound sensors 44b, c are arranged on both sides of the roller 20 with respect to the width 40 of the abrasive belt 18. The solid-borne sound sensors 44a, b, c are realized as solid-borne sound sensors from the company Dittel/Marposs ("AE Sensor-S enter), which detect sound signals in a frequency range of 250-300 kHz. The airborne sound sensor 44d is arranged centrally in the belt grinder 10, in this case is secured to a frame element (not illustrated in more detail) of the belt grinder 10. The airborne sound sensor 44d is in this case sourced for example from the company Mars Sensor and constitutes a silicone MEMS microphone sensor. The detected frequency range is 55 Hz to 20 kHz. A voice analyzer (not illustrated in more detail here) is used to filter out voice components in the measurement data provided by the airborne sound sensor 44d.

Further sensors 50 are also provided in the belt grinder, said sensors being used to capture further measurement data relating to the belt grinder 10. The further sensors 50 comprise a sensor (not illustrated in more detail here) for current consumption and also two thermal imaging sensors 52, which are in each case directed toward the inner side of the rotating abrasive belt 18. As seen in the circumferential direction 22 of the belt, one thermal imaging sensor 52 is located in front of the grinding shoe 12 and one thermal imaging sensor 52 is located behind the grinding shoe 12. The sound sensors 44 and the further sensors 50 are connected to a control device 54 of the belt grinder 10 and also to an external computer device 56 using a gateway 48. The connection in this case is wireless, as indicated by small radio symbols (three dashes). Measurement data are captured and forwarded to the control device 54 by means of the sound sensors 44 and the further sensors 50, on which control device said measurement data are stored in a storage device (not illustrated in more detail here). Said measurement data can be retrieved from the storage device selectively while the method for determining a piece of state information is carried out by way of the computer device 56 that carries out the method.

The computer device 56 provided for carrying out the method for determining a piece of state information relating to the belt grinder 10 is realized as a server that is separate from the belt grinder 10. In a further exemplary embodiment, the computer device 56 can also be integrated in the control device 54 of the belt grinder 10 or can be realized by way of same. The computer device is used to determine a piece of state information relating to the belt grinder 10. To this end, the computer device 56 carries out a computer-implemented method (cf. FIG. 5), which comprises the method steps of providing measurement data relating to the belt grinder 10 and determining the piece of state information from the provided measurement data by means of a machine learning system 58. In this exemplary embodiment, the method enables a piece of state information that can be selected or prescribed by a user of the belt grinder 10 to be determined, cf. FIG. 5. To this end, the user can select a desired piece of state information by means of an input device—in this case realized as an input and output device 60 of the belt grinder 10—that can be connected to the computer device 56. In this case, he has the choice of nine pieces of state information, which each relate to different aspects and properties of the belt grinder 10, the abrasive belt 18 used and/or the grinding process. The user can review or request the result of the evaluation, that is to say the determined state information, by means of the input and output device 60. The computer device 56 is also connected or can also be connected to the control device 54 of the belt grinder 10 via a data communication device (radio connection) in such a way that a control variable, determined using the state information, for actuating a physical actuator (in this case for example a drive motor of one of the rollers 20), can be output to the control device 54 and can thus be translated directly into an activity at the belt grinder 10. The belt grinder 10 can thus be controlled at least partly based on the determined state information. In addition, a piece of information can be output to a user at least partly based on the determined state information by means of the input and output device 60 of the belt grinder 10.

When the method 200 for determining a piece of state information relating to a belt grinder 10 is carried out, the computer device 56 implements a machine learning system 58, which is configured to determine the state information based on the provided measurement data. In particular, the sound sensors 44 and the further sensors 50 are connected or can be connected in terms of signal technology to the computer device 56 for this purpose. The provided measurement data are provided to the machine learning system 58 as input variables in this way. Depending on a plurality of parameters of the machine learning system 58, the machine learning system 58 then determines an output variable, in particular the corresponding state information relating to the belt grinder 10 (as explained at the outset, the term belt grinder 10 in this case likewise includes the components of the belt grinder 10, in particular the abrasive belt 18, workpiece 14, included during a grinding process).

Figure 3:
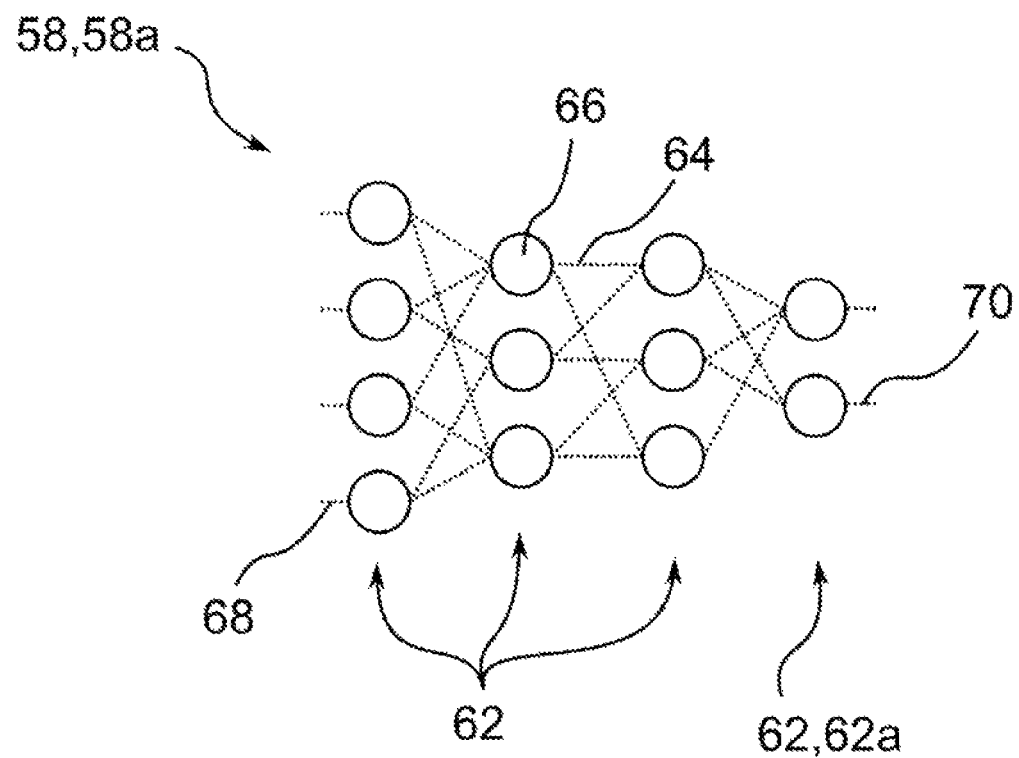
FIG. 3 shows a schematic illustration of an embodiment of a neural network.

FIG. 3 shows a schematic illustration of the machine learning system 58, which in this exemplary embodiment is provided by a neural network 58a. The neural network 58a comprises several layers 62, which are each linked to one another by means of connections 64 and which each comprise several neurons 66. In this case, at least measurement data are provided to the neural network 58a as input variable 68, wherein the measurement data are subsequently propagated by the neural network 58a. The neural network 58a in this case identifies an output variable 70 in layers depending on the input variable 68. For this purpose, each layer 62 identifies an output variable 70 depending on the input variable 68 provided thereto and depending on the parameters of said layer. The output variable 70 is subsequently forwarded to the further layers 62 by way of the connections 64. The last layer 62a of the network 58a enables the state information that has been calculated based on the provided measurement data to be read out.

Figure 4:
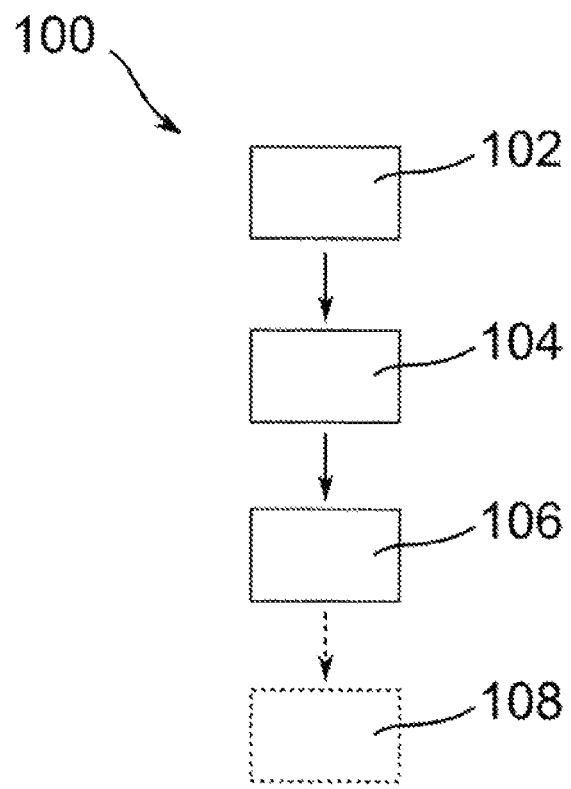
FIG. 4 shows a schematic illustration of an embodiment of a method for training a machine learning system.

FIG. 4 shows a method chart of an exemplary embodiment of the computer-implemented method 100 for the processor-supported training of the machine learning system 58, in particular the neural network 58a. The method 100 is carried out by a training system (not illustrated in more detail here), which trains the machine learning system 58. In this case, in method step 102, training data are provided to the machine learning system 58. The training data comprise training input data and training output data, wherein the training input data comprise measurement data relating to a belt grinder 10 for a plurality of pieces of state information and the training output data respectively comprise at least one assigned piece of state information relating to the belt grinder 10. In this exemplary embodiment, the training input data are measurement data of the sound sensors 44 and the further sensors 50. In this exemplary embodiment, the training output data relate to nine pieces of state information, which each relate to different properties of the belt grinder 10, the abrasive belt 18 used, a workpiece 14 and/or the grinding process: a property that characterizes a workpiece 14 to be processed; a property that characterizes manufacturing defects on the workpiece 14; a property that characterizes an operating mode or operating parameter of the belt grinder 10; a property that characterizes incorrect settings of the belt grinder 10; a property that characterizes a load distribution of the belt grinder 10; a property that characterizes a degree of wear or a wearing of the belt grinder 10; a property that characterizes an abrasive belt 18 used in the belt grinder 10; a property that characterizes clogging and/or blunting of the abrasive belt 18; a property that characterizes a defect of the abrasive belt 18. In method step 104, the machine learning system 58, in particular the neural network 58a, is trained. When the machine learning system 58 is trained, the parameters of the respective layers 62 are adapted in such a way that the machine learning system 58 identifies the respectively assigned training output data depending on the provided training input data. In this case, the machine learning system 58 can be trained using a difference function (cost function), which characterizes in particular a difference between the calculated output variables 70 and the training output data, wherein the difference function is optimized with respect to the parameters by means of a gradient descent method. A gradient descent method of this kind is known to a person skilled in the art from the prior art. After the parameters have been optimized, they are stored in a storage device of the computer device 56 in method step 106. A further method step 108 (illustrated here using dashes) can optionally be added, in which the machine learning system 58 is trained using further measurement data relating to a belt grinder 10 and state information and is thus refined. The further measurement data can in this case relate to another belt grinder 10, wherein the belt grinder 10 is of a different type to the belt grinder 10.

Figure 5:
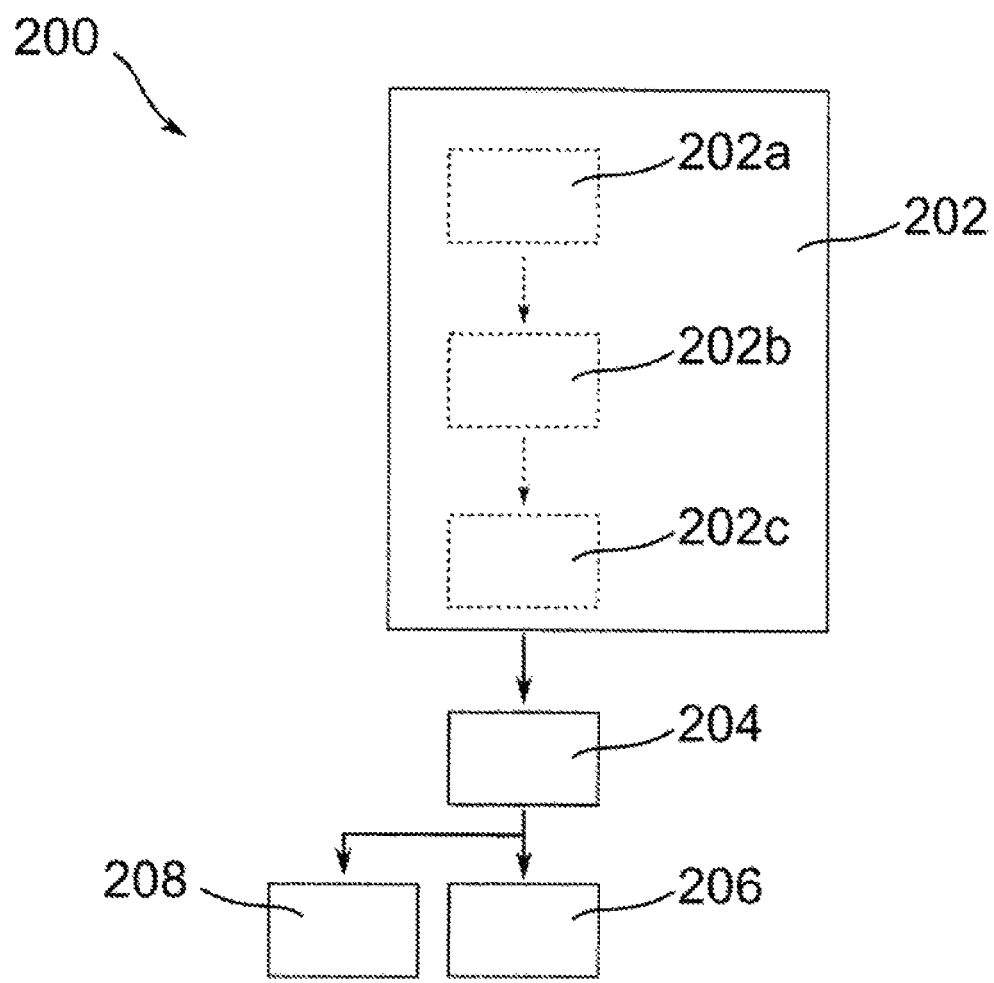
FIG. 5 shows a schematic illustration of an embodiment of a method for determining a piece of state information.

Finally, FIG. 5 illustrates a method 200 for determining a piece of state information relating to a belt grinder 10. In this case, the method 200 is carried out by the computer device 56. In a first method step 202, measurement data relating to the belt grinder 10 are provided to the computer device 56 using the sound sensors 44 and the further sensors 50. The provision can in this case be further divided into the method step 202a—measurement of the measurement data, 202b—buffer storage of the measurement data (for example in the storage device of the belt grinder 10) and 202c—selective retrieval of the measurement data from the storage device by the computer device 56. In method step 204, a piece of state information is determined from the measurement data by means of the machine learning system 58, in particular by means of the neural network 58a, depending on the provided or retrieved measurement data. The state information relates here to the belt grinder 10 (and/or the abrasive belt 18 and/or the workpiece 14 and/or the grinding process). As already mentioned, in this exemplary embodiment, the method enables a piece of state information selectable or prescribable by a user of the belt grinder 10 to be determined. To this end, the user can select one of the desired pieces of state information by means of the input and output device 60 of the belt grinder 10, which input and output device can be connected to the computer device 56 (the method step of the selection is in this case implicitly included in method step 202c—selective retrieval of the measurement data). In this case, the user has the choice of the nine trained pieces of state information, which each relate to different properties of the belt grinder 10, the abrasive belt 18 used and/or the grinding process and/or the workpiece 14: a property that characterizes a workpiece to be processed; a property that characterizes manufacturing defects on the workpiece 14; a property that characterizes an operating mode or operating parameter of the belt grinder 10; a property that characterizes incorrect settings of the belt grinder 10; a property that characterizes a load distribution of the belt grinder 10; a property that characterizes a degree of wear or a wearing of the belt grinder 10; a property that characterizes an abrasive belt 18 used in the belt grinder 10; a property that characterizes clogging and/or blunting of the abrasive belt 18; a property that characterizes a defect of the abrasive belt 18. In method step 206, the result of the evaluation, that is to say a piece of information at least partly based on the determined state information, is then output to the user by means of the input and output device 60. In addition, illustrated here in method step 208, the computer device 56 can output a control variable to the control device 54 of the belt grinder 10. The control variable is at least partly based here on the determined state information.

The invention claimed is:

1. A method for determining state information relating to a belt grinder, the belt grinder having at least one abrasive belt for grinding a workpiece, the method comprising:
generating measurement data relating to the belt grinder; and
determining the state information from the generated measurement data using a trained machine learning system, wherein the trained machine learning system includes a plurality of steps and configured to determine the state information based on the generated measurement data, wherein the plurality of steps comprising:
providing training data comprising training input data and training output data, wherein the training input data comprise measurement data relating to (i) a belt grinder for a plurality of pieces of state information, and (ii) at least two belt grinders of different types, at least two belt grinders of the same type with a different use, or two belt grinders of the same type with the same use, and wherein the training output data comprise in each case at least one assigned piece of the state information relating to the belt grinder;
training the machine learning system, wherein parameters of the machine learning system are adapted such that the machine learning system determines respectively assigned training output data depending on the adapted parameters and depending on the provided training input data; and
adding the trained machine learning system to a computer device of the belt grinder,
wherein the trained machine learning system is configured to determine the plurality of pieces of state information by:
receiving the measurement data; and
determining the state information from the received measurement data, and
wherein the belt grinder has at least one abrasive belt for grinding a workpiece.

2. The method as claimed in claim 1, wherein the measurement data are generated using at least one sound sensor.

3. The method as claimed in claim 2, wherein:
the measurement data are generated using at least one further sensor, and the at least one further sensor is selected from a list of sensors comprising:
sensors for current consumption,
air temperature sensors,
humidity sensors,
distance sensors,
range sensors,
imaging sensors,
temperature sensors,
IR sensors,
thermal imaging sensors,
thickness-measuring sensors,
torque sensors,
dust quantity measuring sensors,
inertial sensors,
acceleration sensors,
path length sensors,
location sensors,
touch-sensitive sensors, and
reflectance sensors.

4. The method as claimed in claim 1, wherein the measurement data are retrieved from the belt grinder selectively.

5. The method as claimed in claim 1, wherein the trained machine learning system comprises a neural network.

6. The method as claimed in claim 1, wherein the trained machine learning system is configured to determine the state information at least relating to one of the following properties:
a property that characterizes the workpiece to be processed,
a property that characterizes manufacturing defects on the workpiece,
a property that characterizes an operating mode or operating parameter of the belt grinder, a property that characterizes incorrect settings of the belt grinder,
a property that characterizes a load distribution of the belt grinder,
a property that characterizes a degree of wear or a wearing of the belt grinder,
a property that characterizes an abrasive belt used in the belt grinder,
a property that characterizes clogging and/or blunting of the abrasive belt, and
a property that characterizes a defect of the abrasive belt.

7. The method as claimed in claim 1, wherein the belt grinder is controlled at least partly based on the determined state information and/or a piece of information is output by an output device at least partly based on the determined state information.

8. The method as claimed in claim 1, further comprising:
filtering voice components from the measurement data before determining the state information.

9. A method for training a machine learning system, comprising:
providing training data comprising training input data and training output data, wherein the training input data comprise measurement data relating to (i) a belt grinder for a plurality of pieces of state information, and (ii) at least two belt grinders of different types, at least two belt grinders of the same type with a different use, or two belt grinders of the same type with the same use, and wherein the training output data comprise in each case at least one assigned piece of the state information relating to the belt grinder;
training the machine learning system, wherein parameters of the machine learning system are adapted such that the machine learning system determines respectively assigned training output data depending on the adapted parameters and depending on the provided training input data; and
adding the trained machine learning system to a computer device of the belt grinder,
wherein the trained machine learning system is configured to determine the plurality of pieces of state information by:
receiving the measurement data; and
determining the state information from the received measurement data, and wherein the belt grinder has at least one abrasive belt for grinding a workpiece.

10. The method as claimed in claim 9, further comprising:
receiving further measurement data relating to the belt grinder, wherein at least one piece of the state information relating to the belt grinder is assigned to the further measurement data; and
further training the machine learning system using the received further measurement data.

11. The method as claimed in claim 10, wherein the training input data comprise the measurement data and the further measurement data for a plurality of pieces of the state information and the training output data comprise in each case at least one assigned piece of the state information.

12. The method as claimed in claim 9, wherein the training output data are selected from a list of pieces of the state information relating to at least the following properties:
a property that characterizes the workpiece to be processed,
a property that characterizes manufacturing defects on the workpiece,
a property that characterizes an operating mode or operating parameter of the belt grinder,
a property that characterizes incorrect settings of the belt grinder,
a property that characterizes a load distribution of the belt grinder,
a property that characterizes a degree of wear or a wearing of the belt grinder,
a property that characterizes an abrasive belt used in the belt grinder,
a property that characterizes clogging and/or blunting of the abrasive belt, and
a property that characterizes a defect of the abrasive belt, or combinations thereof.

13. The method as claimed in claim 9, wherein a non-transitory computer-readable storage medium is configured to store a computer program, which when executed on a computer device causes the computer device to carry out the method.

14. A belt grinder comprising:
an abrasive belt configured to grind a workpiece;
at least one sound sensor configured to generate measurement data; and
a trained machine learning system as claimed in claim 9, the trained machine learning system configured to receive the measurement data and to determine a piece of state information relating to the belt grinder based on the received measurement data.

15. The belt grinder as claimed in claim 14, further comprising:
a grinding shoe,
wherein the at least one sound sensor is arranged on or in the grinding shoe.

16. The belt grinder as claimed in claim 14, further comprising:
a roller suspension system including a roller,
wherein the at least one sound sensor is assigned to the roller and is arranged on the roller suspension system.

17. The belt grinder as claimed in claim 14, further comprising:
a grinding shoe,
wherein the at least one sound sensor is arranged on the grinding shoe and/or in the belt grinder substantially centrally with respect to a width of the abrasive belt and/or with respect to a width of the grinding shoe.

18. The belt grinder as claimed in claim 14, further comprising:
a grinding shoe,
wherein at least two of the sound sensors are arranged on the grinding shoe and/or in the belt grinder and/or in a manner assigned to a roller on both sides with respect to a width of the abrasive belt and/or with respect to a width of the grinding shoe.

19. The belt grinder as claimed in claim 14, wherein the at least one sound sensor is operably connected to a control device of the belt grinder and/or to an external computer device using a gateway.

20. The belt grinder as claimed in claim 14, wherein the at least one sound sensor includes at least one of a MEMS microphone sensor, a Piczo sensor, and a laser microphone sensor.

* * * * *